March 3, 1959 — C. E. CROOKS — 2,875,664
WING HEAD FASTENER
Filed Sept. 17, 1953
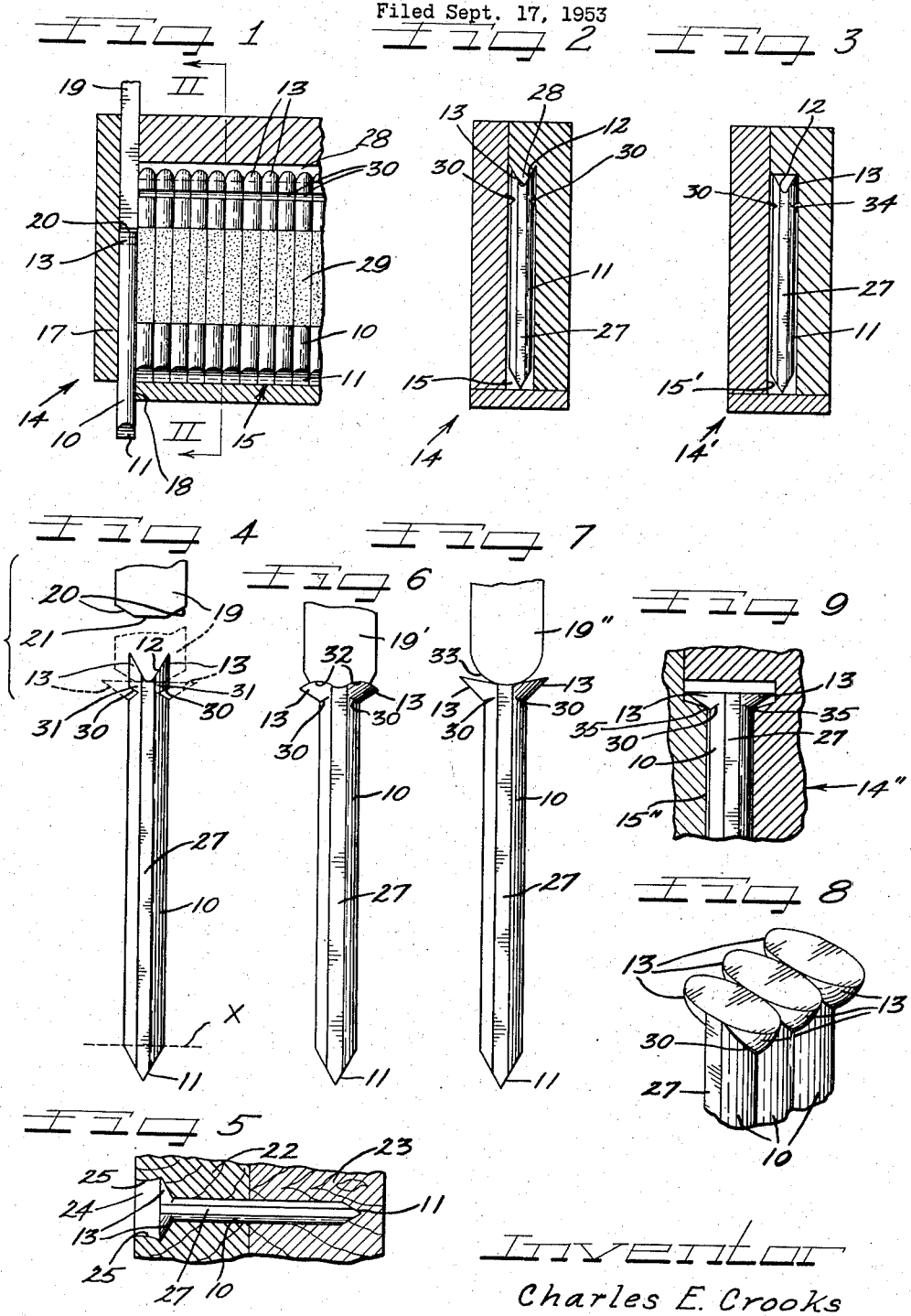
Inventor
Charles E. Crooks

United States Patent Office 2,875,664
Patented Mar. 3, 1959

2,875,664

WING HEAD FASTENER

Charles E. Crooks, Highland Park, Ill., assignor to Spotnails, Inc., Evanston, Ill., a corporation of Illinois Application September 17, 1953, Serial No. 380,755

1 Claim. (Cl. 85—28)

The present invention relates to the art of nail-type fasteners and means for driving the same.

This application is a continuation-in-part of my copending application Serial No. 311,517, filed September 25, 1952, now abandoned.

For many purposes a headed fastener such as a conventional round-headed nail or finishing nail is required. It is desirable to set or drive such nails by means of a nailing machine. However, when utilizing round-headed nails, the machine must be supplied with a magazine for the loose nails from which they are fed by cumbersome and oftentimes complex mechanism to a nail driver.

It will be clear that many advantages can be gained by providing a nail driving machine of as light weight and relatively simple construction as the ordinary stapling machine and for which nails would be supplied in stick form, that is, adhered together side-by-side for ease in handling and loading into the machine.

An important object of the present invention is to provide an improved fastening device that lends itself readily to handling in multiples in adhered stick form for loading into a machine for driving by means of a driving blade or plunger, such fastening device being with or without laterally projecting head as supplied but, if without such head, having means on the head portion thereof for affording an effective laterally projecting head structure incident to driving the fastener into an assembly to be secured together by the fastener.

Another object of the invention is to provide a nail having a construction at one end which develops into a laterally projecting head structure incident to spreading pressure during manufacture or responsive to impart thereagainst by a driving member as the nail is driven into an assembly to be secured together thereby.

A further object of the invention is to provide a pin-like fastener which as an incident to driving of the same into an assembly to be secured together thereby becomes a headed nail such as a finishing nail.

Still another object of the invention is to provide a nail-like fastener which as supplied for use in a nailing machine comprises a pin-like member that may be readily produced either from wire or as a stamping from sheet metal and which has a spreadable head structure that is susceptible of spreading to provide a laterally projecting head as originally supplied or as an incident to striking thereagainst of a driver during use.

Yet another object of the invention is to provide a spreadable head nail and means for driving the same having a driving portion generally complementary to the head structure for forming a laterally projecting head on the nail as an incident to driving the nail by pressure of the driver against said spreadable head structure.

It is a still further object of the invention to provide preheaded nails from straight strip stock, with oppositely directed bent-over lateral head shoulder ears or lugs provided thereon, without bulging of material in that dimension of the head which is normal to the direction of spread of the head lugs, so as to avoid interference with proper side-by-side parallel adhered straight stick-form cooperation of a substantial series of the nails.

Other objects, features and advantages of the present invention will be readily apparent from the following detailed description of certain preferred embodiments thereof taken in conjunction with the accompanying drawing in which:

Figure 1 is a schematic view of a nail driving machine embodying features of the invention having therein spreadable head nails according to the present invention;

Figure 2 is a vertical sectional detail view taken substantially on the line II—II of Figure 1;

Figure 3 is a sectional view similar to Figure 2 but showing a modification in the magazine of the nail driving machine;

Figure 4 is an enlarged elevational view of one of the spreadable head nails and a driving member cooperable therewith;

Figure 5 is a fragmentary sectional view through a pair of wooden members secured together by one of the spreadable head nails after the nail has been driven by the driving tool disclosed;

Figure 6 is an elevational view of the spreadable head nail with a modified form of driver;

Figure 7 is an elevational view of the spreadable head nail but disclosing a further modified form of driving member;

Figure 8 is a fragmentary isometric view of the upper portion of a stick of nails modified in that the heads thereof have been spread laterally as an incident to manufacture and the nails supplied to the user in preheaded form; and Figure 9 is a fragmentary sectional view similar to Figure 2 but showing the machine modified in the magazine thereof to accommodate the preheaded nails of Figure 8.

Having reference to Figures 1, 2 and 3, a spreadable head nail structure is shown comprising individual pin-like elongated nail elements or members 10. Each of the nails 10 is free from any lateral projection, that is, nothing projects laterally beyond the longitudinal periphery of the nail. More particularly, the nails 10 are without a laterally projecting head structure. In an economical construction, the nails 10 are made from straight wire stock but they may also be made as sheet metal punchings or stampings.

At one end each of the nail members 10 may be provided with a penetrating tip 11 which may be pointed as shown to provide a substantially V-shaped chisel point 11. Where preferred, the chisel point may be omitted so that the piercing end of the nail may be blunt as for example on the line X as shown in Figure 4. Where the nails have the chisel point 11, driving of the chisel point across the grain of a wooden member will avoid splitting the wooden member. On the other hand, this requires that close attention be given to the manner in which a driving machine is applied when driving the nails 10 loaded therein. Where the nails have a blunt end as indicated at X, no special care need be taken to avoid splitting since a blunt end nail will ordinarily cut across the grain and thus at least minimize the tendency toward splitting.

At its head end, the nail 10 is provided with a transverse notch 12 which preferably is of generally V-shape with the root running parallel to the chisel point 11. The V-notch 12 provides at each opposite side of the head portion of the nail a similar spur-like bifurcation or head ear or lug 13 having the respective outer sides thereof in longitudinal peripheral alignment with the shank portion of the nail. The inner sides of the head ears are divergently related at an appropriate angle, such as approximately 60°.

Since the head ears 13 taper from juncture thereof at the root of the groove or notch 12 to the tip extremities of the ears, and the material from which the nail 10 is made is reasonably soft steel or other suitable metal, pressure applied to the inner sides of the ears 13 will tend to bend them apart to project beyond the respective opposite sides of the nail. This is taken advantage of to provide a laterally projecting head structure on the nail as an incident to driving the nail into an assembly such as a wooden assembly to be held together by the nail.

It will be appreciated, of course, that an ordinary hammer could be used to drive the nails 10 individually and that the blows of the hammer head against the head end of the respective nail being driven will tend to spread the head ears 13 apart as the nail is being driven. However, if the hammer is not applied quite squarely to the head end of the nail, one of the ears 13 may be bent inwardly instead of outwardly, or one of the ears may be bent more than the other. It is therefore desirable to drive the nails 10 in such a manner that application of the driving force is directed squarely toward the head end of the nail between the ears 13 to spread them apart uniformly into the lateral head relationship to the body of the nail.

The nails 10 may advantageously be driven from a suitable driving machine 14 (Figures 1 and 2) into which a plurality of the nails may be loaded into a magazine 15 in vertical side-by-side alignment. The magazine 15 may be simply in the form of a longitudinal slot dimensioned to support the nails 10 slidably therein so that the series of nails can be pushed forwardly by means of any desirable pusher acting against the rearmost nail and to thereby push the foremost of the nails against a stop member 17 at the front of the machine. A driveway is provided between the stop 17 and the adjacent portion of the machine down which the foremost nail is adapted to be driven out of a discharge opening 18 by a driver 19 adapted to be motivated in any suitable fashion from above. In Figure 1 the driver 19 is shown as having partially driven the foremost nail 10 from the machine through the discharge opening 18. The driver 19 may be in the form of a blade member appropriately guided by the upper portion of the machine 14.

In order to assure proper spreading of the head lugs or ears 13 by the driving tip of the driver member 19 as an incident to the driving operation and more especially as the driven nail 10 encounters the resistance offered by the members or assembly into which it is being driven, the driving tip is preferably contoured or shaped as indicated at 20 (Figures 1 and 4) to provide angularly related, tapered spreader faces. For example, the spreader faces 20 may be symmetrically formed to slope from a central truncation or flat 21 on a differential angle that is substantially less than the angle of the inner sides of the head ears 13. Where the angle of the inner faces of the head ears is approximately 60° the angle of the spreader faces 20 may be approximately 30°. Width of the driver 19 is greater than the width of the nails 10, especially at the spreader faces 20. Hence, as the driver tip engages in the groove 12 in the generally complementary relation as shown in Figure 1, the spreader faces 20 engage at the inner side of the upper ends of the head lugs or ears 13. As resistance to driving increases in the nail 10 due to the force required to cause the nail to penetrate the assembly into which driven, the head ears tend to spread apart as the spreader faces 20 cam down the inner sides of the ears.

When the nail being driven passes beyond the confinement of the driveway 18 of the machine so that there is no longer any restriction upon spreading of the ears 13, the by now increasing pressure against the inner sides of the ears causes them to spread apart substantially. This coincides with development of maximum resistance of the nail to the driving force by virtue of the nail now being completely embedded in the assembly into which it is being driven. This results in the head ears or lugs being then spread by the action of the spreader faces 20 of the driver to their maximum lateral extent, which is greater than the width of the driver 19, as indicated in dash outline in Figure 4. In the final increment of driving stroke, the truncated terminal 21 of the driver 19 engages the base portions of the spread head lugs 13 across the root of the head groove 12 and tends to flatten the crown of the head. The nail 10 is thereby provided with a functionally efficient head that strongly resists pulling through the member of the assembly engaged thereby. It may also be observed that the head thus provided on the nail is of substantially greater lateral extent than is customary in round-headed finishing nails while nevertheless the nail can be used in places where a finishing nail is desirable.

In Figure 5 is shown one of the nails 10 driven into a wood assembly comprising members 22 and 23 held together by the nail. The head 13—13 of the nail, it will be observed, is countersunk within a depression 24 in the entry face of the member 22. By reason of the continuing spreading of the head of the nail as the nail is set, the countersink depression 24 has the sides thereof where the head lugs 13 act thereon slightly undercut, that is, tapering toward a larger dimension at the base of the depression or countersink recess 24. As a result, the head lugs 13 interlock as spurs with the overhanging walls, indicated at 25 of the countersink recess 24 and quite effectively resist withdrawal or backing out of the nail 10 as might be occasioned by vibrations or weathering in the service of the assembly held together by the nail. This countersinking of the nails is effected as the nails are driven from the machine 14 by adjustment of the driver member 19 to project in countersinking relation beyond the driveway of the machine at the conclusion of the driving stroke thereof.

For the purpose of facilitating assembly of the nails into stick form, that is, adhered together side-by-side in a substantially rigid assembly to facilitate handling, packing and eventual loading of the nails, respective pairs of opposite parallel flat longitudinal faces 27 are preferably provided on the sides of the substantially round cross-section nails which oppose one another in a magazine charge assembly of the nails. By preference the flat sides 27 are in planes normal to the groove 12 in the heads of the nails. Thereby the grooves 12 of a stick assembly of the nails line up, as an incident to the abutment of the longitudinal flat faces 27, to provide a continuous slot or groove longitudinally of the top edge of the stick. The magazine 15 of the driving machine 14 may accordingly be provided with a depending guide rail 28 fitting loosely and slidably into the upwardly opening nail groove to minimize frictional resistance to forward movement of the nail by substantially holding the stick of nails away from the side walls defining the magazine chamber 15. Moreover, at the front end portion of the chamber 15, the depending track or rail 28 restrains the foremost nail 10 in the stick against accidentally tipping forwardly into the nail driveway should such a nail become dislodged from the stick as an incident to driving of the foremost nail. This avoids danger of jamming of a tipped or canted nail in the driveway.

By having the flat sides 27 opposing one another, substantially increased adhesion area is afforded by contiguous ones of the otherwise generally round bodied nails 10 for effective holding of an adhesive 29 by which the nails are secured firmly but separably in a flat stick relationship for handling, packing and loading.

Means are provided for facilitating bending of the head ears or lugs 13 and to avoid undesirable thickening or spreading of the head portion of the nail at the base of the lugs adjacent the ends of the head groove 12. To this end diametrically opposite, preferably V-shaped, apexially aligned notches 30 are provided at the base portion of the outer sides of the head ears or lugs 13. The notches 30 are relatively shallow and extend transversely parallel to the head groove 12 but with the apexes of the notches or grooves 30 in alignment spaced below the root of the groove 12, in such relationship that a substantial connecting neck or bar of material 31 joins each of the ears 13 to the body of the nail 10. The notches 30 facilitate bending of the lugs or ears 13 at the connecting portions when the driver member 19 functions to drive the nail 10 from the machine 14. The notched-base spread-relief thus provided for the head 13 is especially valuable where the nail 10 is to be used in connecting together assemblies of relatively soft material such as wood.

In the modification of Figure 6, the driving tip of driver 19' is provided with centrally converging spreader faces 32 of preferably slightly concave shape terminating at their outer margins in substantially horizontal alignment and directed substantially horizontally. Through this arrangement, as the spreader faces 32 drive spreadingly against the head ears or lugs 13 the head lugs are caused to collapse down into and close the notches 30. Thereby the lugs spread effectively to maximum lateral projection practicable to afford a head of high holding efficiency on the nail.

Where for any reason it is preferred to spread the head ears or lugs 13 of the nails without action thereon by generally complementary but differentially angled converging flat or concave spreader faces on the driver, a driver 19" (Figure 7) may be utilized having a convexly formed driving tip 33. This tip may be generally semi-cylindrical in contour and in one sense does provide opposite or cooperative spreader faces that converge toward the tip of the driver but at their convergence afford a smooth arcuate surface that drives down into the groove 12 of the nail to act upon the inner faces of the head lugs 13 to spread the same apart substantially as shown in Figure 7. It may be observed that after the nail head is spread as indicated in Figure 7 the ends of the head lugs 13 afford generally outwardly and laterally directed divergent spurs that will interlock with substantially digging action with walls of a countersink recess.

It will be observed that the spread head lugs afford upwardly and outwardly generally tapering or cam surfaces at their outer or relatvely remote sides. This facilitates countersinking and spreading apart of the member into which the head is embedded so that the fibers of the member suffer minimum crushing or tearing and thus tend more effectively to return or rebound into nail head locking relation at the outer side of the nail head within a countersunk recess.

Another advantage of providing the nails 10 with the head side notches 30 resides in that in stick arrangement of the nails the notches 30 provide a continuous groove along the upper portion at each side of the stick. In the magazine 15' of the driving machine 14' (Figure 3), one of the grooves 30 affords a channel cooperative with a complementary supporting monorail 34 projecting inwardly from the wall of the magazine chamber 15' adjacent to the top thereof, for supporting the stick of nails in friction reducing manner, and especially above the floor defining the magazine, for feeding toward the driving station under the influence of a pusher or other impelling medium in the machine. The rail 34 serves also to prevent forward or rearward tilting or canting of any one of the nails that may break loose from the stick. It will be appreciated that while the rail 34 is shown schematically in Figure 3, it may comprise a separate member or may be an integral part of one of the walls of the machine defining the magazine chamber 15'. Ordinarily it may be desirable to make the walls of the machine from a relatively soft but generally moldable plastic or soft, readily moldable or casting metal and in such instances the monorail 34 may be formed as a separate hardened metallic rail member secured in suitable manner within the housing.

As will be observed from Figures 3, 4 and 8, the drivers 19, 19' and 19" are preferably wider than the nails 10. This oversize of the driver is desirable to resist breakage. Hence, the nail guide or driveway must also be correspondingly wider than the nails. However, by virtue of the spreadable character of the nail head ear lugs 13 and the generally complementary construction of the driver tip surfaces 20, 32 and 33, the head ear lugs spread into engagement with the sides of the nail driveway as driving force gradually increases on the nail heads. Thereby the nail being driven is held straight and against tendency to cant in the driveway and thus go crooked into the assembly into which driven. Furthermore, after the head of the nail leaves the guideway of the machine, the head ear lugs cooperate with the tip of the driver to hold it centered on the nail head during the final phase of setting the nail, including countersinking.

Where it is desired to supply the nails in stick form with the heads preheaded, that is, with the head spurs already laterally spread apart, the nail 10 having the side notches 30 in the head portion thereof lends itself especially well to this purpose. Accordingly, as shown in Figure 8, a substantial plurality of the nails 10 may be adhered together with the adjacent flat longitudinal faces 27 in abutment and with the head ears, spurs or lugs 13 spread laterally in opposite directions as an incident to manufacture. Thereby, of course, the notches 30 are closed.

The notches 30 are especially advantageous for provision of the preheaded nails since thereby displacement relief is afforded between the head lugs 13 and the adjacent body of the nail 10 in each instance. This avoids spreading or bulging of the nail heads in a direction normal to the displacement or spreading of the head lugs 13, thereby enabling parallel coextensive adherence of the respective preheaded nails 10 in the stick of nails.

In use, a stick of the preheaded nails 10 may be fed into a machine 14" as shown in Figure 9 providing a magazine 15 having the upper portion enlarged to accommodate the heads of the nails and providing generally upwardly facing respective shoulders 35 cooperative with the downwardly facing generally oblique shoulders afforded by the head ears or lugs 13 in supporting the stick of nails in the magazine. It will be observed that the shoulders 35 may be formed on an angle that is greater relative to the axis of the nails than the angle of the opposing head shoulders of the nails, so as to limit engagement between the supporting shoulders 35 and the nail heads to substantially line contact but with substantially funneling effect. Thereby the nails are supported substantially centered and laterally spaced relative to the vertical walls opposing the body or shank portions of the nails. If preferred, of course, the shoulders 35 may be in the form of rails directed inwardly from the walls of the magazine of the machine.

It will be understood that modifications and variations may be effected without departing from the scope of the novel concepts of the present invention.

I claim as my invention:

A nail having an elongated straight body provided with opposite transversely rounded sides affording the major portion of the periphery of the nail and separated by opposite parallel narrow flat faces, one end of the nail body having a generally V-shaped penetrating tip extending across the body between said flat faces, the opposite end portion of the nail body having a pair of head ear lugs normally extending as continuations of said rounded sides and separated by a generally V-groove running out at said flat faces and centered with respect to said tip, there being similar V-shaped notches opening from the rounded sides of the nail body and extending short of said flat faces adjacent to the root of said V-notch at the base of each of said ear lugs, said last mentioned V-notches enabling bending over of said ear lugs laterally into overhanging relation to said rounded side to provide a head on the nail, with the opposite normally divergent sides of the last mentioned notches substantially in abutment to determine the ultimate head forming position of the bent over ear lugs, said last mentioned notches affording such bending relief for the base portions of the ear lugs as to avoid distortion of the adjacent head portions of the flat faces.

References Cited in the file of this patent

UNITED STATES PATENTS

| | | |
|---|---|---|
| 230,632 | Hubbard | Aug. 3, 1880 |
| 253,250 | Woodward | Feb. 7, 1882 |
| 312,550 | Brock | Feb. 17, 1885 |
| 334,361 | Eppler | Jan. 12, 1886 |
| 377,452 | Harvey | Feb. 7, 1888 |
| 450,990 | Campbell | Apr. 21, 1891 |
| 652,380 | Weeks | June 26, 1900 |
| 909,720 | Webb | Jan. 12, 1909 |
| 1,033,241 | Graham | July 23, 1912 |
| 1,217,749 | Greenfield | Feb. 27, 1917 |
| 1,442,969 | Pope | Jan. 23, 1923 |
| 1,717,479 | Wakeman | June 18, 1929 |
| 2,154,747 | Hyser | Apr. 18, 1939 |
| 2,355,955 | Cummings | Aug. 15, 1944 |
| 2,369,961 | Gisondi | Feb. 20, 1945 |
| 2,379,826 | Peterson | July 3, 1945 |
| 2,391,061 | Mackintosh | Dec. 18, 1945 |
| 2,392,160 | LaPlace | Jan. 1, 1946 |
| 2,430,321 | Anstett | Nov. 4, 1947 |
| 2,468,821 | Goodstein | May 3, 1949 |
| 2,580,065 | Anstett | Dec. 25, 1951 |
| 2,672,610 | Colton | Mar. 23, 1954 |

FOREIGN PATENTS

| | | |
|---|---|---|
| 13,900/1892 | Great Britain | July 15, 1893 |
| 522,395 | Great Britain | June 17, 1940 |
| 272,012 | Switzerland | Feb. 16, 1951 |